(12) United States Patent
Botwright

(10) Patent No.: US 12,017,890 B2
(45) Date of Patent: Jun. 25, 2024

(54) SPREADER BAR FOR DISTRIBUTING A LIFTING FORCE OF A CRANE AND METHOD OF USING SUCH A SPREADER BAR

(71) Applicant: Vestas Wind Systems A/S, Aarhus N (DK)

(72) Inventor: Adrian Botwright, Sabro (DK)

(73) Assignee: Vestas Wind Systems A/S, Aarhus N. (DK)

( * ) Notice: Subject to any disclaimer, the term of this patent is extended or adjusted under 35 U.S.C. 154(b) by 107 days.

(21) Appl. No.: 17/918,606

(22) PCT Filed: May 7, 2021

(86) PCT No.: PCT/DK2021/050147
§ 371 (c)(1),
(2) Date: Oct. 13, 2022

(87) PCT Pub. No.: WO2021/228339
PCT Pub. Date: Nov. 18, 2021

(65) Prior Publication Data
US 2023/0145454 A1  May 11, 2023

(30) Foreign Application Priority Data

May 14, 2020 (EP) ..................................... 20174817

(51) Int. Cl.
*B66C 1/10* (2006.01)
(52) U.S. Cl.
CPC .................................... *B66C 1/108* (2013.01)
(58) Field of Classification Search
CPC ................................ B66C 13/085; B66C 1/22
See application file for complete search history.

(56) References Cited

U.S. PATENT DOCUMENTS 3,837,698 A   9/1974  Foster

FOREIGN PATENT DOCUMENTS

EP    1795491 A1   6/2007
SE     411743 B    2/1980

OTHER PUBLICATIONS

European Patent Office, International Search Report and Written Opinion in PCT Application No. PCT/DK2021/050147, Jul. 2, 2021.
European Patent Office, European Search Report in EP Application No. 20174817.5, Nov. 9, 2020.

*Primary Examiner* — Moshe Wilensky
(74) *Attorney, Agent, or Firm* — Wood Herron & Evans LLP

(57) ABSTRACT

The invention relates to a spreader bar (1) for distributing a lifting force from a crane (2) onto a two lifting regions (3,4) f a load (5) to be lifted. The spreader bar comprises a frame (6) and first and second systems (7,8). Each system comprises a lifting pulley (9), a connector (10) for connecting the spreader bar to the respective lifting region via a main wire (11) guided by the lifting pulley, an actuator (15) for vertically moving the connector via an actuator wire (16), and a movably arranged suspension element (19) connecting the actuator wire and the main wire. A compensator (20) compensates for possible fluctuations in the vertical distance between the respective lifting region of the load and the spreader bar. Such fluctuations can be due to the crane or the load being located on a floating vessel. When the suspension element is engaged with a blocking element (23), the lifting force from the crane can be transferred to the main wire in order to lift the load.

15 Claims, 12 Drawing Sheets

SPREADER BAR FOR DISTRIBUTING A LIFTING FORCE OF A CRANE AND METHOD OF USING SUCH A SPREADER BAR

FIELD OF THE INVENTION

The present invention relates to a spreader bar for distributing a lifting force of a crane onto a first lifting region and a second lifting region of a load to be lifted. In particular, it relates to such a spreader bar with which it is possible to compensate for possible fluctuations in the vertical distance between the spreader bar and the load during the establishment of the connection between the load and the spreader bar, following connection of one end and prior to the connection of the second end, and before initiating the lift off of the load.

BACKGROUND OF THE INVENTION

The present invention may e.g. find use in relation to the installation of offshore wind turbines. The components, such as the blades, for the wind turbines are typically transported to the site of installation by a feeder vessel from where they are transferred onto an installation vessel used during the installation, the installation vessel being either floating or jacked-up. The blades are typically arranged in protective transport frames which may be arranged in stacks of three blades each arranged in a transport frame. The transfer of the blades is typically performed by use of a crane provided with a spreader bar used to distribute the force from the crane onto more regions of the load to be lifted. Due to the sea motions of the feeder vessel and possibly also of the installation vessel, the load will be subject to increased movements, predominantly roll, pitch and heave. Whilst in motion, climbing the blade transport frames is not safe for the workers performing the installation, and manually landing and connecting the swinging lifting equipment will be difficult. Root and tip yokes are typically connected to the top of the stacked transport frames. These yokes are fitted with one half of a quick connect/disconnect mechanism, the other half hanging from the spreader bar. During connection and before the blade or blade stack, typically in a transport frame, is released from the deck feeder vessel, these movements, and in particular the heave movements, may cause snatch loads in the transport frames and the spreader bar which loads are above the design loads. When the load has been connected to the spreader bar, it can also be difficult to ensure that it does not get into so much swinging motion during the transfer that it hits the crane or bumps into parts of the vessel onto which it is being loaded.

Hence, an improved spreader bar and a method of using it during lifting would be advantageous.

OBJECT OF THE INVENTION

It is an object of the present invention to provide a method and system with which the transfer of a load between two locations that have fluctuations in their vertical distance, such as due to wave motions, is facilitated.

It is another object of the present invention to provide a method and system with which it the risk of damaging a load being transferred by a crane from a floating vessel to another vessel is lower than with known systems.

It is a further object of the present invention to provide an alternative to the prior art.

In particular, it may be seen as an object of the present invention to provide a spreader bar and a method that solves the above mentioned problems of the prior art.

SUMMARY OF THE INVENTION

Thus, the above-described object and several other objects are intended to be obtained in a first aspect of the invention by providing a spreader bar for distributing a lifting force from a crane onto a first lifting region and a second lifting region of a load to be lifted, the lifting regions being separated by a horizontal distance, wherein the spreader bar has a frame and comprises a first system for applying a part of the lifting force to the first lifting region and a second system for applying another part of the lifting force to the second lifting region, wherein each of the first and second systems comprises:
 a lifting pulley arranged on the frame, so that a horizontal distance between the lifting pulleys of the first and second systems corresponds to the horizontal distance between the first and second lifting regions,
 a connector for connecting the spreader bar to the respective lifting region via a main wire guided by the lifting pulley,
 an actuator arranged on the frame for vertically moving the connector via an actuator wire,
 a suspension element connecting the actuator wire and the main wire, and
 a compensator mounted or arranged on the frame for acting on the actuator wire to compensate for possible fluctuations in the vertical distance between the respective lifting region of the load and the spreader bar and thereby ensure that the main wire and the actuator wire remain under tension after the connector has been connected to the load, and wherein, for each of the first and second systems, the suspension element is movable along a support having a blocking element arranged at a predetermined position, so that when the suspension element is engaged with the blocking element, no further compensation will take place by the compensator, and the lifting force from the crane can be transferred to the main wire in order to lift the load.

Such a spreader bar is particularly relevant when the spreader bar is used for lifting a load from a floating vessel or barge to another vessel, either floating or jacked-up. It could e.g. be for lifting of a wind turbine blade or a stack of wind turbine blades in relation to the installation of an offshore wind turbine. The blades are typically transported to the site of installation by a feeder vessel from where they are moved to another jacked-up or floating vessel used for the wind turbine installation. During this transportation and transfer, the blades are typically arranged in a transport frame, either individually or in stacks of e.g. three blades.

However, the spreader bar as well as the method of the present invention can also be used for other lifting applications, including operations where there is no fluctuations in the vertical distance between the respective lifting region of the load and the spreader bar. For such a use, the actuator wires can be blocked, and the compensators and/or actuators can be disconnected.

The horizontal distance between the lifting pulleys of the first and second systems does not need to be identical to the horizontal distance between the first and second lifting regions of the loads to be lifted. However, the difference there between should not be so large that it makes the lifting too difficult or impossible. This means that it may be relevant to use a spreader bar that is selected for the specific load to be lifted with respect to the locations of the lifting pulleys. It may also be possible to move the lifting pulleys of a spreader bar between different positions on the frame to make the spreader bar suitable for lifting different sizes of loads. Such different locations could e.g. be different brackets in which the lifting pulleys could be mounted. Another option would be to have the lifting pulleys mounted in rails along which they could be moved and to which their positions for use could be securely fixed before use of the spreader bar.

When a spreader bar is used for the transfer of a stack of wind turbine blades from one vessel to another, an advantage of the present invention is that the motions of the vessel do not result in the blade or stack of blades hitting the spreader bar suspended over it. The lowering function allows the spreader bar to be kept out of the heave motion of the stacks. Once the spreader bar is connected, the motion accommodated by the compensator is greater than the motions, particularly heave, resulting from the sea state.

For both the main wire and the actuator wire, the term "wire" means any flexible, long element that could be used in the same manner as a wire. It could also be referred to as "rope" or "wire rope", or it could be e.g. a chain, strap or belt provided that it is dimensioned and shaped to function in accordance with the other components of the system. The wires used could e.g. be made from ultra-high-molecular-weight polyethylene (UHMWPE), such as from UHMWPE fibres. UHMWPE is a subset of the thermoplastic polyethylene which has extremely long chains and which usually has a molecular mass between 3.5 and 7.5 million atomic mass unit (amu). An example of such a type of rope is a Dyneema® rope which is a rope that can be up to 15 times stronger than steel, more abrasion resistant than high carbon steel, and which is resistant to UV light.

Here and in the following, reference is made to one lifting pulley and one main wire for each of the first and second systems. However, that does not exclude that there is more than one lifting pulley and more than one main wire in one or both of the first and second systems.

The support along which the suspension element is movable could e.g. be one or more guiding surfaces along which the suspension element slides back and forth during use of the spreader bar. Alternatively or in combination therewith, the support could be profiles shaped to guide opposite end surfaces of the suspension element from two sides. Still another alternative would be that the suspension element slides hanging from a support located above the suspension element during use of the system. Any support fulfilling the required carrying and guiding of the suspension element is covered by the scope of the invention.

The frame of the spreader bar may extend between a first end where the lifting pulley of the first system is arranged and a second end where the lifting pulley of the second system is arranged. However, the frame may also extend beyond the points where the lifting pulleys are arranged.

The actuators may be selected from a linear actuator, a winch, a pivotally arranged arm, or a combination thereof. Examples of different actuators and their functioning will be shown in the figures. By "a combination" is preferably meant that the actuator of the first system may be different from the actuator of the second system. However, an actuator could also comprise more than one type of the mentioned elements.

The actuator wires may be guided by guide pulleys. Hereby the functioning of the actuators and their action on the connectors could be made as reliable as possible. This is particularly relevant, when the actuator wires extend in a meandering manner e.g. to be long enough to allow for uses where there are large fluctuations in the vertical distance between the load and the spreader bar, such as in rough sea conditions.

In presently preferred embodiments of the invention, the actuators are adapted to function independently of each other. Hereby it is easier to control the use of the system when one lifting region is to be connected to the respective connector at a time as will be explained in further details below.

The actuators are preferably remotely controlled so that the lifting can be controlled e.g. by the crane operator typically located at a distance from the spreader bar, such as on a vessel from which the load is to be un-loaded or on a vessel onto which the load is to be loaded.

In any of the above-described embodiments, each of the compensators may comprise one or more of the following: linear actuator, spring, pulley, or a piston, or a winch. Some examples will be shown in the figures.

The compensators are preferably adapted to function independently of each other. Hereby it is easier to control the use of the system when one lifting region is to be connected to the respective connector at a time as will be explained in further details below. Furthermore, the system is designed to also take into account that the vertical distances between the spreader bar and the first and second lifting regions may not be the same, e.g. due to waves of the surrounding sea.

In particular, an actuator and a compensator may be included in one and the same unit, system or device. Such unit, system or device may as an example be a winch. Such winch may be a hydraulic winch. Such hydraulic winch may include a grooved drum and a radial piston motor with negative brake. I.e. such winch may include both actuator function and compensation function, and is thus able to handle both position of a connector and compensation of the connector.

Then such winch with combined position and compensation abilities, can reel in and out to position the connector, and also be working as a compensator. It can as an example be working as a compensator when a wanted position of the connector is reached, and the connector is connected to the load, and then the winch is reeling in and out to compensate for any movements of the crane and/or movements of the component to be lifted. This compensation is as further elaborated herein provided until continued lifting of the spreader bar (e.g. +2.5 meters from a position where the connector was connected) so that the suspension element engages with the blocking element. Hereby no further compensation takes place by the compensator, and the lifting force from the crane is transferred to the main wire to lift the load.

An advantage of having the actuator and the compensator in separate systems, may be that compensation requires the system to reel in and out very fast, whereas positioning may not require the same speed—and this difference may be preferred to handle in separate systems. An advantage of the combination of functions, e.g. in one hydraulic winch as further explained above, may be seen as a more simple mechanical setup.

The spreader bar may comprise:
a first section extending from the first end to a central region, and the first system is arranged in the first section, and
a second section extending from the second end to the central region, and the second system is arranged in the second section.

However, the scope of protection also covers systems wherein some of the components are arranged at a central region. It will also be possible to have components arranged at another half of the frame than where the corresponding lifting pulley is arranged.

The frame may comprise a main frame including the central region, a first extension rigidly mounted to the main frame and extending to the first end, and a second extension rigidly mounted to the main frame and extending to the second end. Hereby it will be possible to dismount the frame into smaller parts e.g. for storage or transportation. It may also be possible to have a plurality of first and second extensions that can be used to adapt the spreader bar to match different sizes of loads to be lifted; i.e. to match loads having different horizontal distances between the first and second lifting regions. Furthermore, it may be possible be disassemble a frame without such extensions or a main frame as just described into smaller parts. In such embodiments, the disassembly may be performed with the other components remaining mounted to the frame, or the disassembly may include removing some or all of the other components.

Each of the connectors may be provided with at least one sensor and at least one locking mechanism adapted for remote-controlled establishment of a secure connection between the connectors and the load to be lifted. The connector could also comprise a light indicator and/or a camera to make it easier for the operator to see when the connector is in the right position for connection and a further indicator to indicate that a safe connection has been established before starting the lifting. This could include providing a signal on the remote control. By use of remote control, the spreader bar can be connected to the load without the need for a person close to the system during use. This may be particularly relevant in rough sea conditions where it could be potentially dangerous to get close to and thereby risk being hit by a moving spreader bar or connector.

A spreader bar according to the present invention may further comprise a power supply, such as a battery, for powering the active components thereof. Hereby it can function without the need for establishment of cable connection to an external power supply and the related risk of damaging such cable connection e.g. due to the movements caused by the surrounding waves.

The above-described object and several other objects are furthermore intended to be obtained in a second aspect of the invention by providing a method of lifting a load by using a crane with a spreader bar according to any of the preceding claims, the method comprising the following steps:

arranging the spreader bar with the lifting pulley of the first system above the first lifting region of the load and the lifting pulley of the second system above the second lifting region, for the first system, adjusting the vertical distance between the connector and the first lifting region by use of the actuator, and establishing the connection between the connector and the first lifting region, for the second system, adjusting the vertical distance between the connector and the second lifting region by use of the actuator, and at the same time allowing the compensator of the first system to adjust the length of the actuator wire and main wire of the first system to maintain tension therein, establishing the connection between the connector of the second system and the second lifting region, lifting the spreader bar and at the same time for each of the first and second systems allowing the compensator to adjust the length of the actuator wire and main wire to maintain tension therein, by continued lifting of the spreader bar, for each of the first and second systems allowing the suspension element to move along the support until it engages with the blocking element, and by continued lifting of the spreader bar, also lifting the load.

The step of arranging the spreader bar as described above may be performed as a first single step so that the spreader bar is aligned or substantially aligned with the load along its length, before the connector of the first system is connected to the first lifting region. However, the scope of protection also covers methods wherein the end of the spreader bar comprising the lifting pulley of the first system is arranged above the first lifting region of the load and the spreader bar is aligned horizontally angled with respect to the load when the connector of the first system is connected to the first lifting region. Then, subsequently the spreader bar is rotated to bring the lifting pulley of the second system above the second lifting region, before the connector of the second system is brought into connection with the second lifting region. The last mentioned way of using the spreader bar can be seen as a further precaution to avoid the spreader bar being struck by the load, then the first end can be concentrated on whilst connection is being done.

As described in relation to the system according to the first aspect of the invention, the actuators may be adapted to function independently of each other, and the actuators may be remotely controlled. Furthermore, each of the connectors may be provided with at least one sensor and at least one locking mechanism, and wherein secure connections between the connectors and the load to be lifted may be established by remote control.

The first and second aspects of the present invention may each be combined. These and other aspects of the invention will be apparent from and elucidated with reference to the embodiments described hereinafter.

BRIEF DESCRIPTION OF THE FIGURES

The spreader bar according to the invention as well as the method of using the spreader bar will now be described in more detail with regard to the accompanying figures. The figures show one way of implementing the present invention and is not to be construed as being limiting to other possible embodiments falling within the scope of the attached claim set.

DETAILED DESCRIPTION OF AN EMBODIMENT

Figure 1:
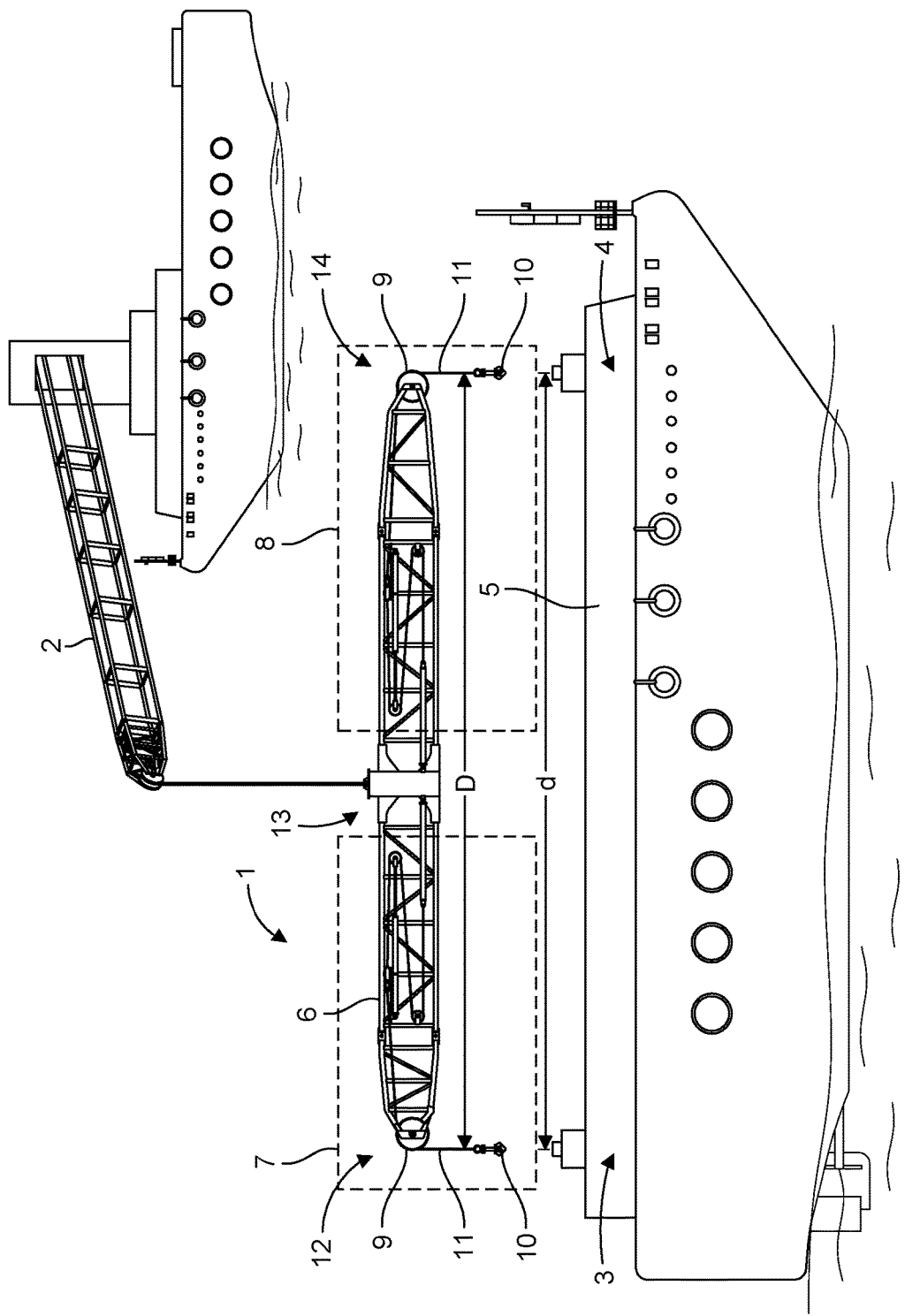
FIG. 1 schematically shows the overall idea of the present invention.

FIG. 1 schematically shows how a spreader bar 1 can be used for distributing a lifting force from a crane 2 onto a first lifting region 3 and a second lifting region 4 of a load 5 to be lifted. The first and second lifting regions 3,4 are separated by a horizontal distance d. The spreader bar 1 has a frame 6 and comprises a first system 7 for applying a part of the lifting force to the first lifting region 3 and a second system 8 for applying another part of the lifting force to the second lifting region 4. Each of the first and second systems 7,8 comprises a lifting pulley 9 arranged on the frame 6, so that a horizontal distance D between the lifting pulleys 9 of the first and second systems 7,8 corresponds to the horizontal distance d between the first and second lifting regions 3,4. In this figure, the two horizontal distances d,D are shown as being the same, but as described above, that is not necessarily the case. Each of the first and second systems 7,8 further comprises a connector 10, such as a hydraulic operated shackle, for connecting the spreader bar 1 to the respective lifting region 3,4 via a main wire 11 guided by the lifting pulley 10.

In FIG. 1, the first and second systems 7,8 are shown schematically as two boxes. The boxes are shown arranged at the two different halves of the frame 6, but it is also covered by the scope of the present invention that some of the components of the first and second systems are arranged differently. In other words, in this embodiment, the spreader bar 1 comprises:
  a first section extending from the first end 12 to a central region 13, and the first system 7 is arranged in the first section, and
  a second section extending from the second end 14 to the central region 13, and the second system 8 is arranged in the second section.

Figure 2:
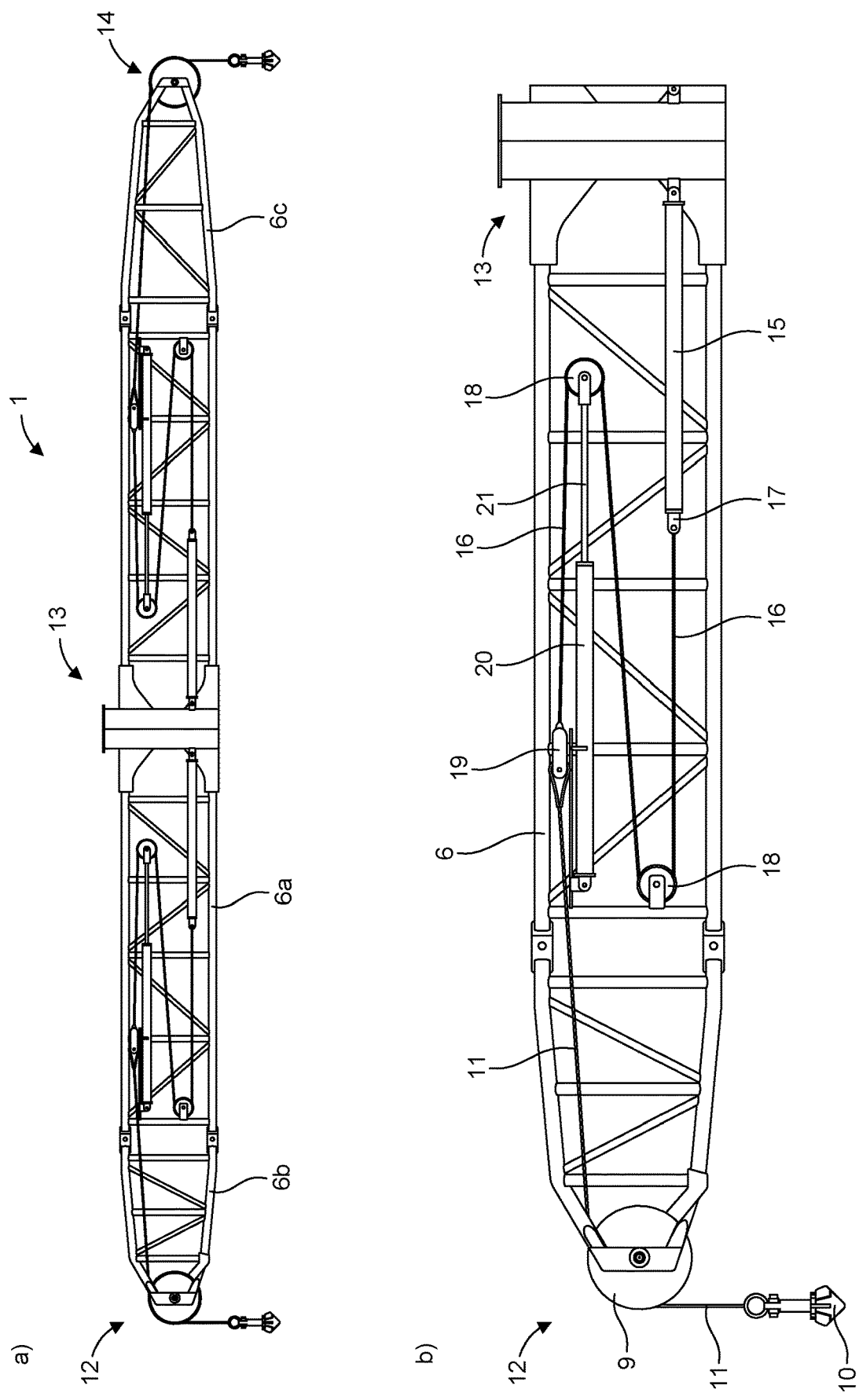
FIG. 2 schematically shows an embodiment of a spreader bar according to the invention.

FIG. 2 shows schematically an example of a design of a spreader bar 1 according to the present invention. FIG. 2.*a* shows the whole spreader bar 1, and FIG. 2.*b* shows half of it to more clearly illustrate the details. In this embodiment, the frame 6 of the spreader bar 1 extends between a first end 12 where the lifting pulley 9 of the first system 7 is arranged and a second end 14 where the lifting pulley 9 of the second system 8 is arranged. The frame 6 comprises a main frame 6*a* including the central region 13, a first extension 6*b* rigidly mounted to the main frame 6*a* and extending to the first end 12, and a second extension 6*c* rigidly mounted to the main frame 6*a* and extending to the second end 14. In this illustration, the first and second extensions 6*b*, 6*c* are of different sizes which may e.g. be relevant, if the weight of the load 5 to be lifted is not the evenly distributed along a length of the load 5. This would e.g. be the case for wind turbine blades having the centre of gravity closer to the root end than to the tip end. As described above, the first and second extensions 6*b*, 6*c* may e.g. be removed from the main frame 6*a* for storage or transportation. The spreader bar 1 in FIG. 2 has a symmetrical design except for the sizes of the extensions 6*b*, 6*c*, and the following description therefore relates to the first system 7 which in this embodiment is fully arranged at the same half of the spreader bar 1. The overall functioning would be the same for other arrangements of the components with respect to the frame 6.

In FIG. 2, the first system 7 has an actuator 15 in the form of a linear actuator arranged on the frame 6 for vertically moving the connector 10 via an actuator wire 16. One end of the actuator 15 is mounted on the frame 6, and at the other end a piston 17 of the actuator 15 is connected to the actuator wire 16 which is shown as guided by guide pulleys 18. The actuator 15 is preferably remotely controlled. The first system 7 has a suspension element 19 connecting the actuator wire 16 and the main wire 11. When the piston 17 moves to an extended position, the connector 10 will be lowered towards the load 5 via the actuator wire 16 and the main wire 11.

A compensator 20 is mounted or arranged on the frame 6 for acting on the actuator wire 16 to compensate for possible fluctuations in the vertical distance between the respective lifting region 3 of the load 5 and the spreader bar 1 and thereby ensure that the main wire 11 and the actuator wire 16 remain under tension after the connector 10 has been connected to the load 5. In the embodiment in FIG. 2, the compensator 20 is in the form of a linear actuator having one of the guide pulleys 18 for the actuator wire 16 arranged at the end of the piston rod 21. The compensator 20 is illustrated horizontally arranged, but it could also be vertically or inclined arranged as long as the orientation of the acting force can compensate for the fluctuations and keep the tension in the actuator wire 16 and the main wire 11. In FIG. 2, the compensator 20 is being pushed to compress when the load 5 has been connected to the connector 10. However, in alternative embodiments, it could be pulled to extend instead. In such an embodiment, the compensator 20 could be fixed in the central region 13 of the frame 6 with a piston and pulley at either end and have the actuator wire 16 looping around the entire compensator 20, so that when the actuator wire 16 is pulled, the compensator 20 is compressed from either end.

Figure 3:
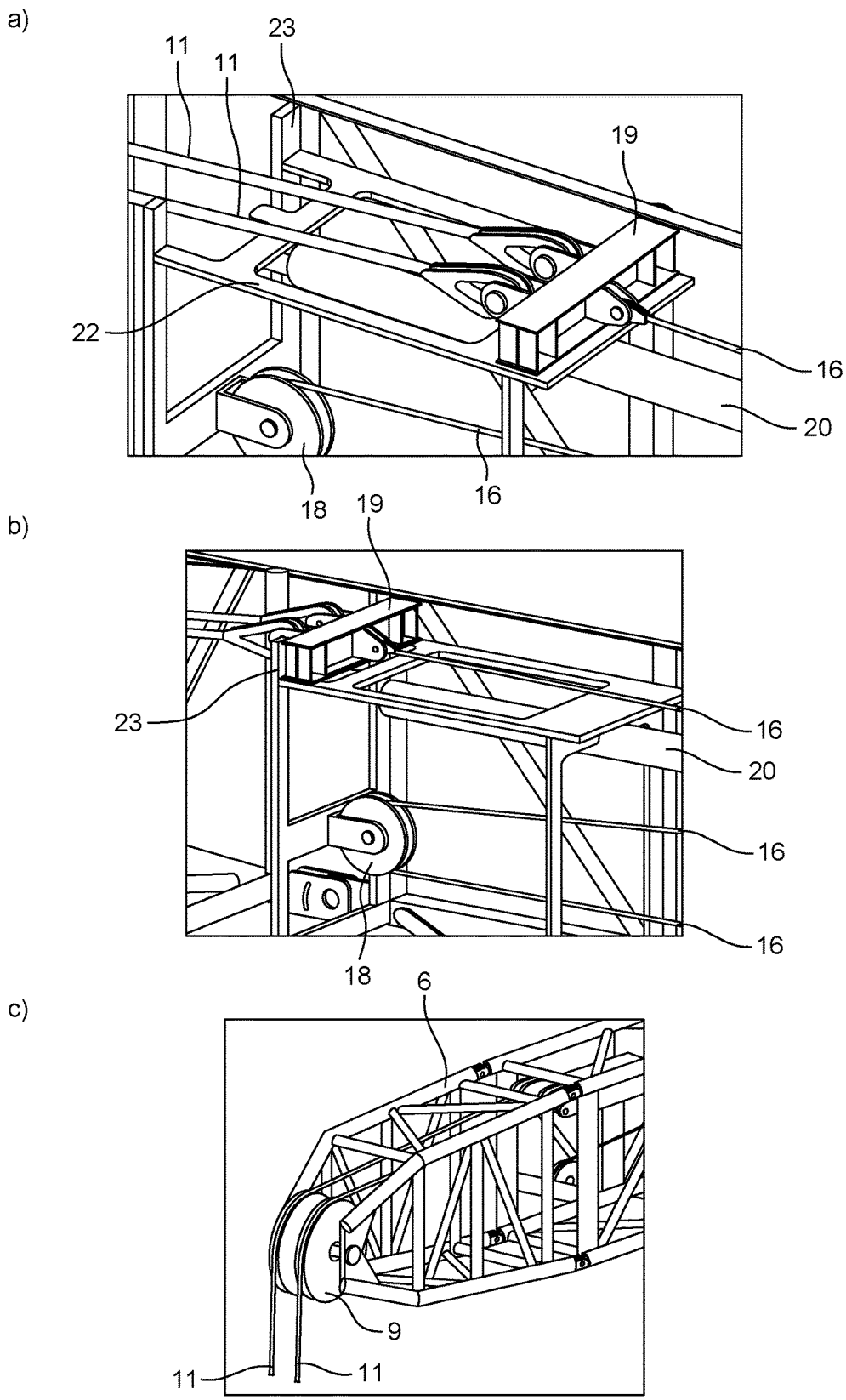
FIG. 3 schematically shows partial views of the region around a suspension element and a lifting pulley of the embodiment in FIG. 2.
Figure 4A:
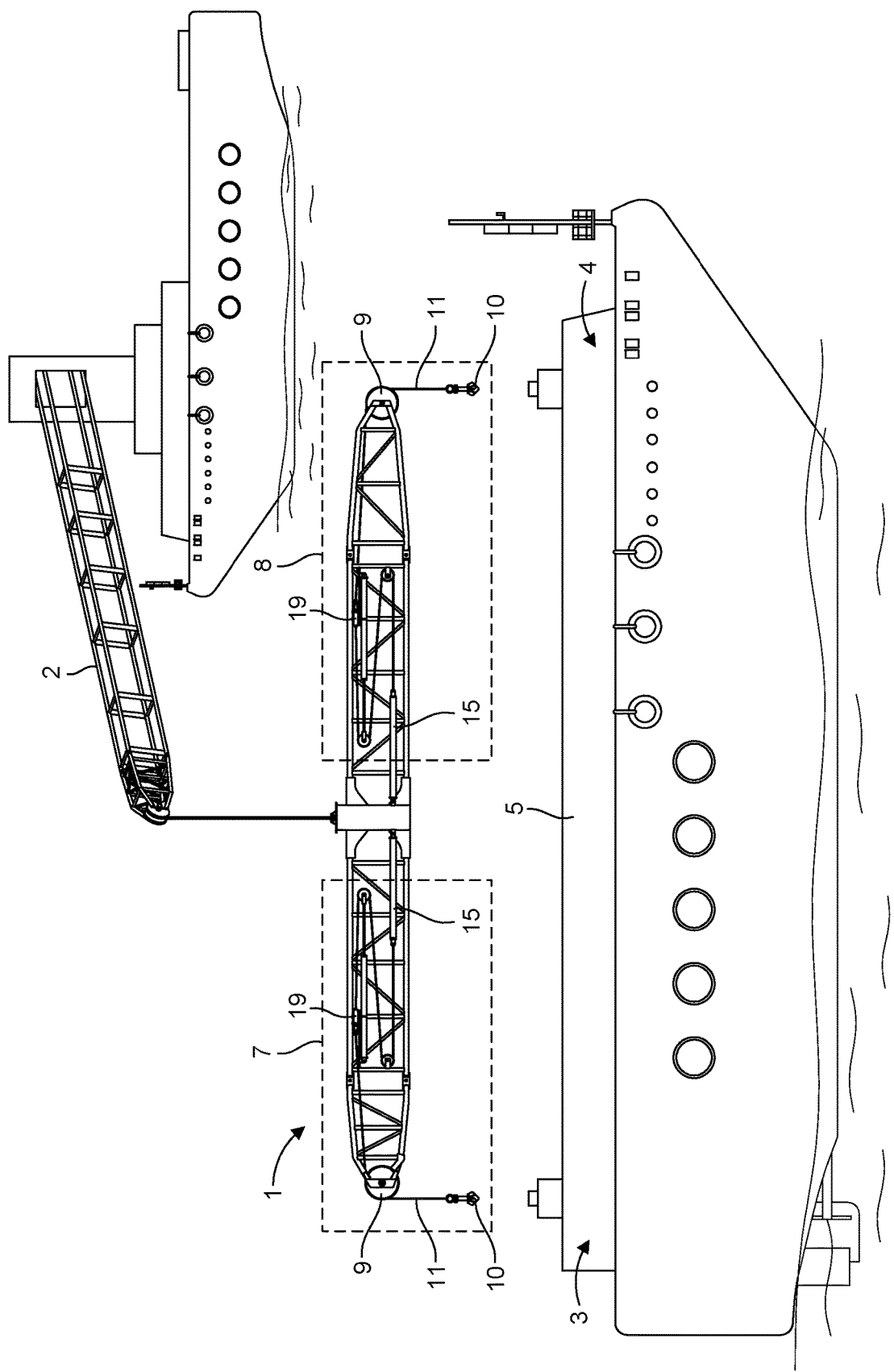
FIGS. 4a-4h schematically show the steps in a method of using the spreader bar in FIG. 2 for lifting a load.
Figure 4B:
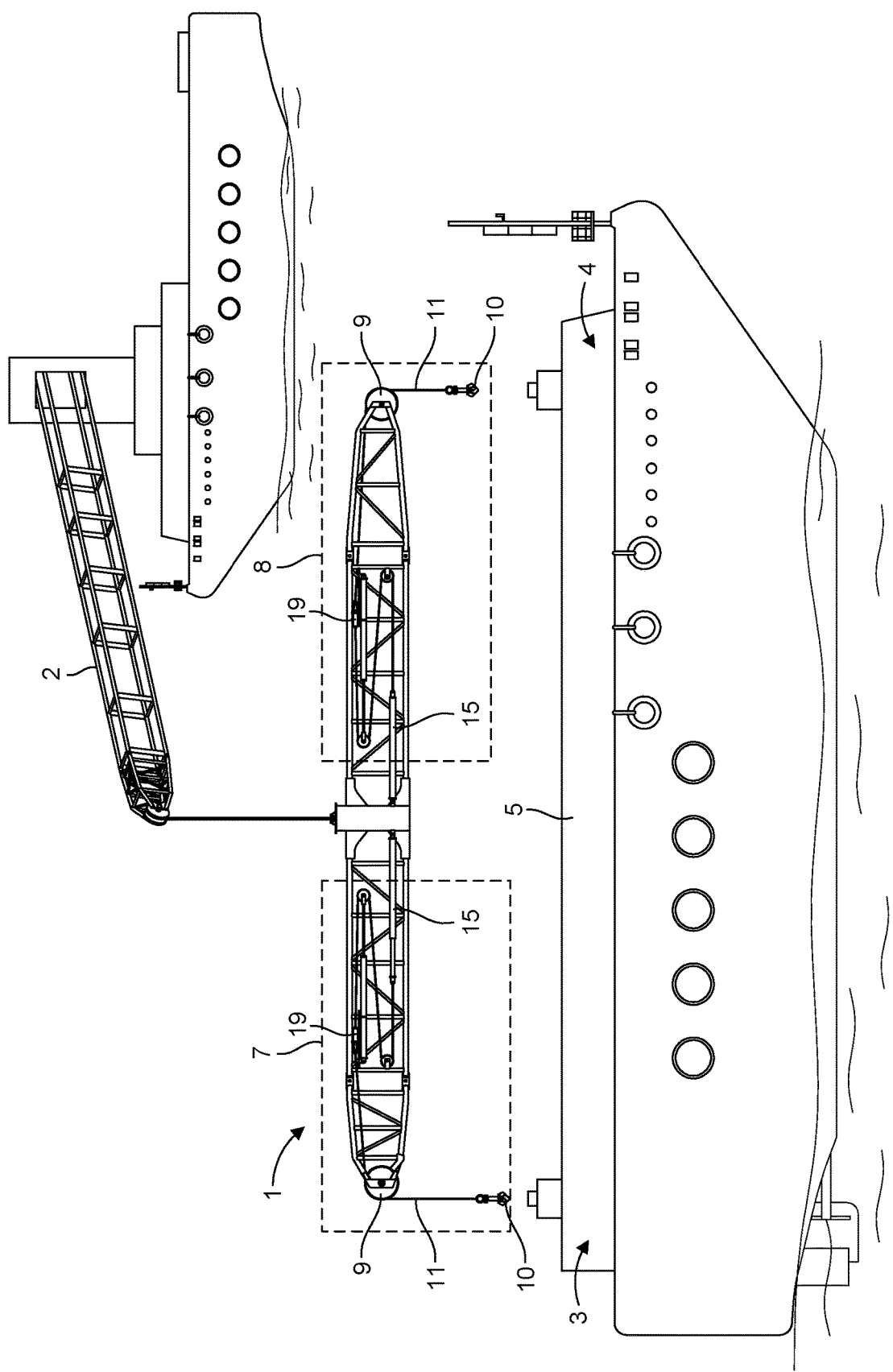
Figure 4C:
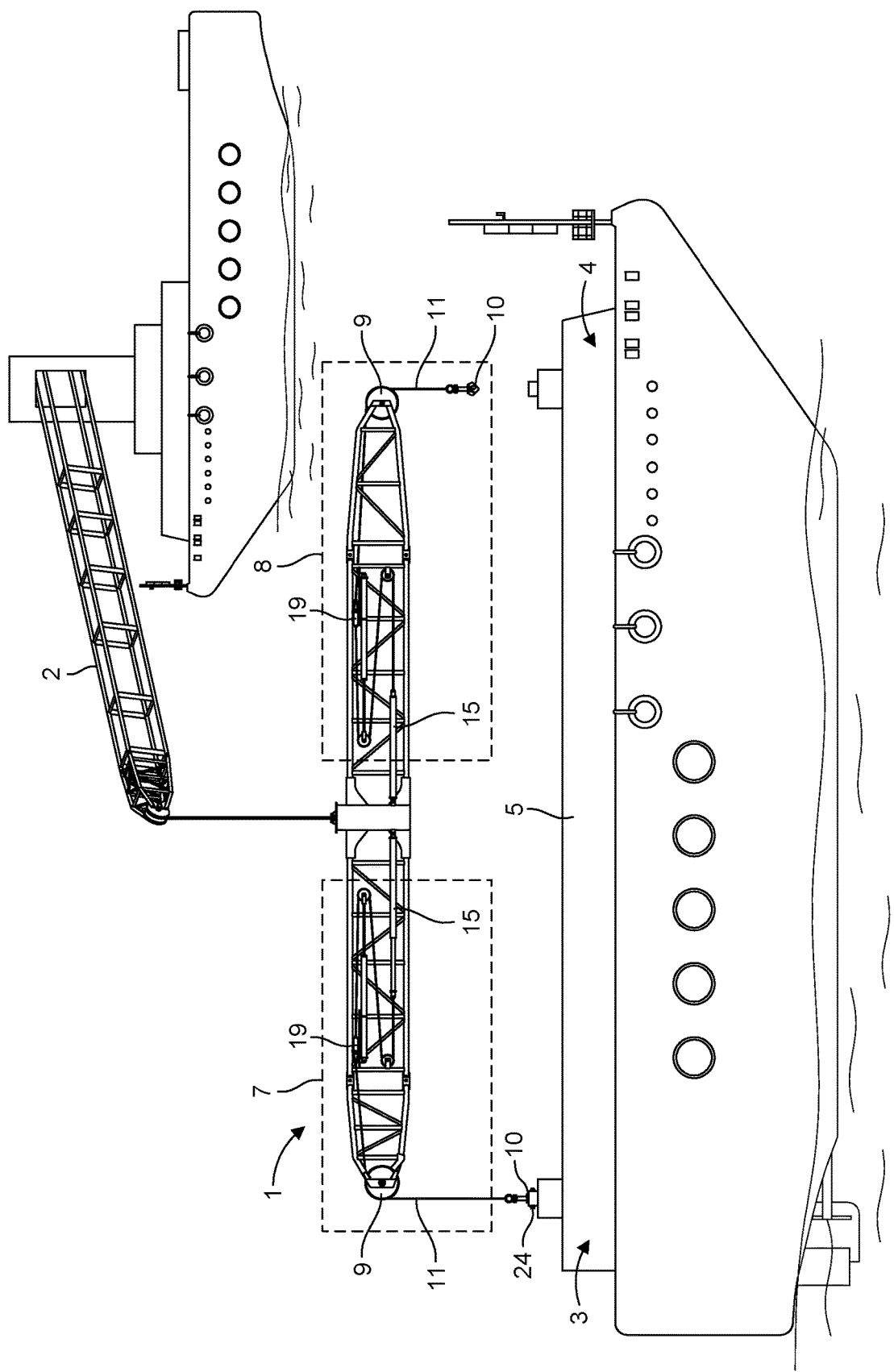
Figure 4D:
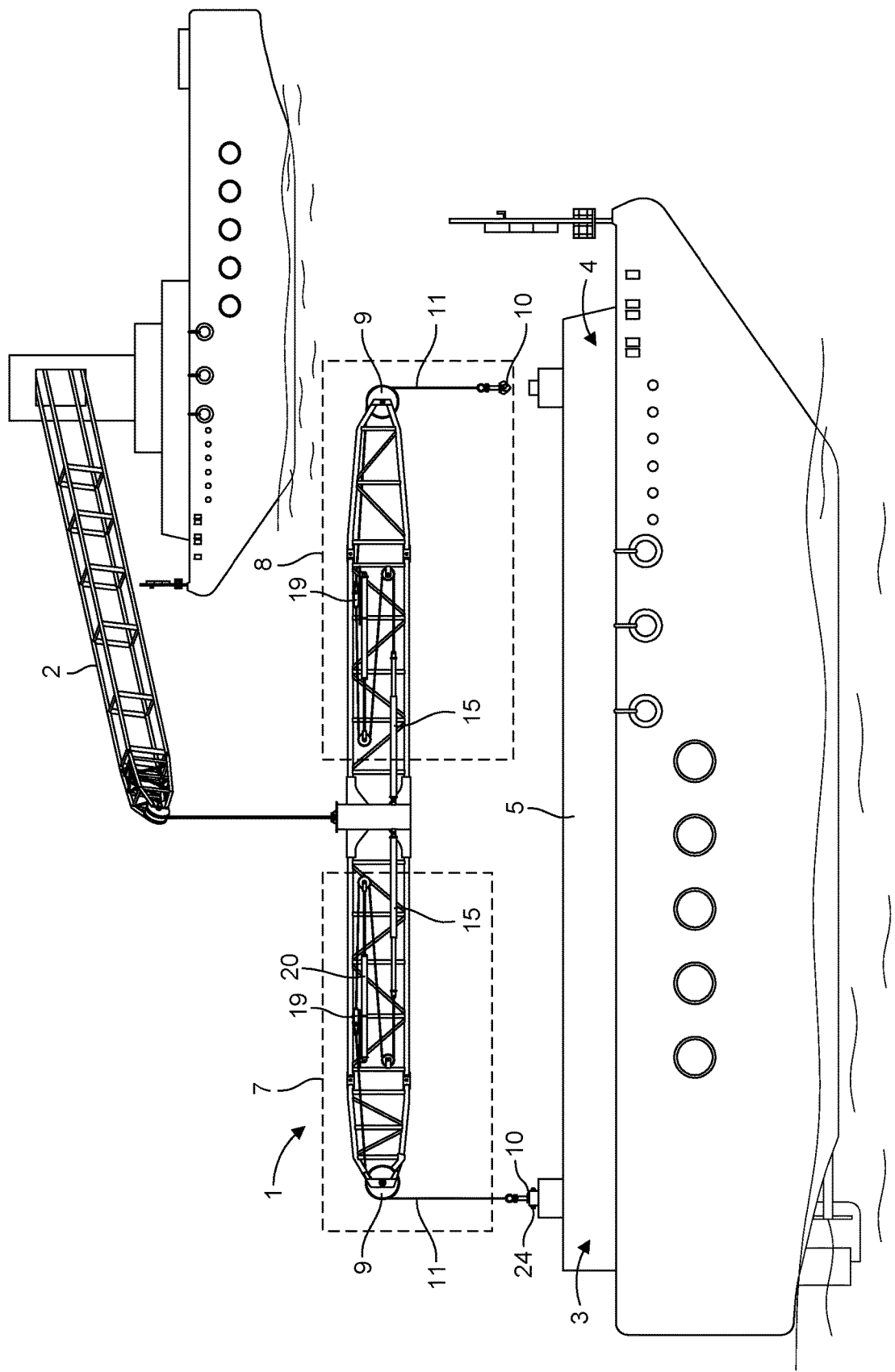
Figure 4E:
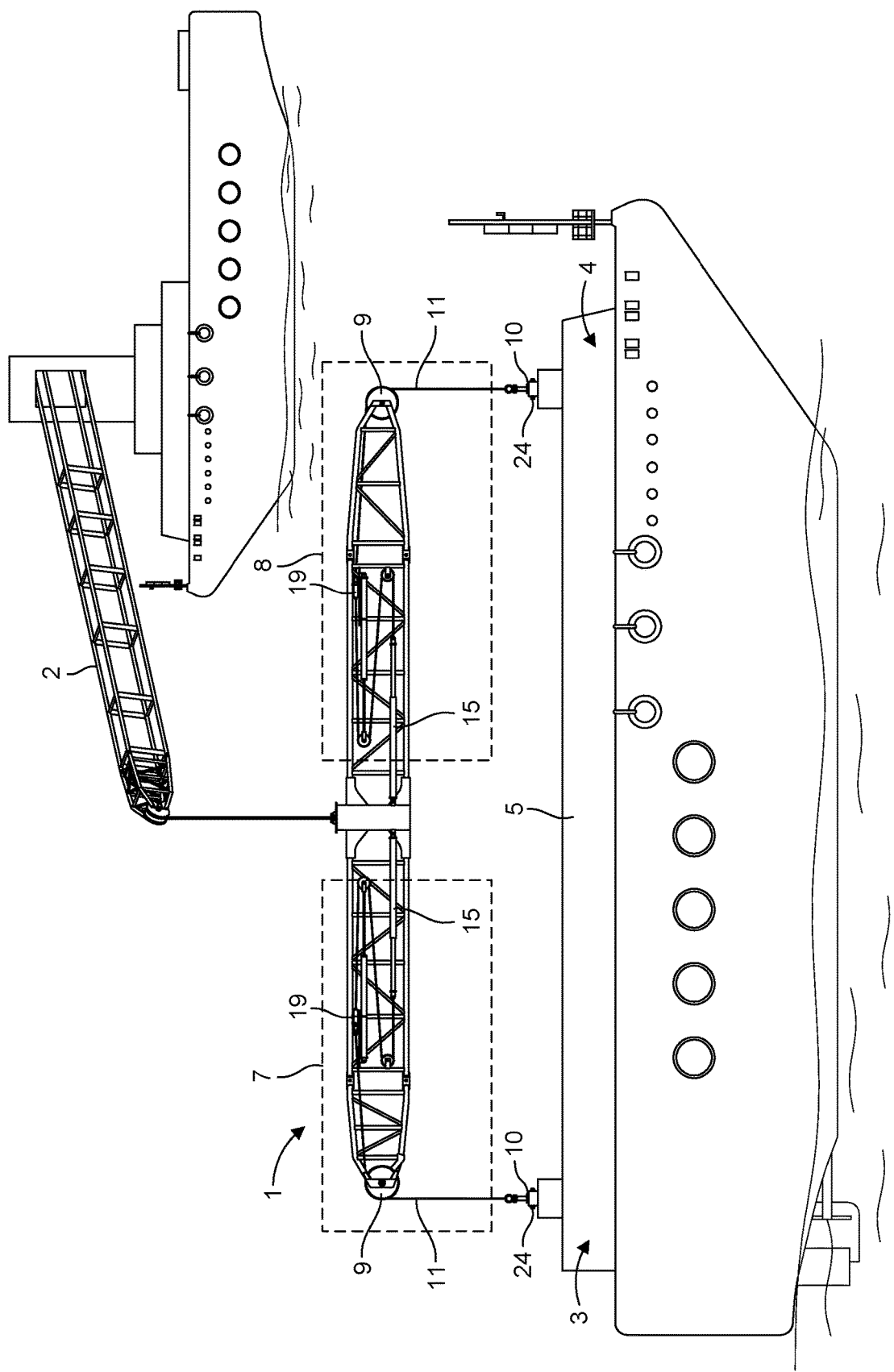
Figure 4F:
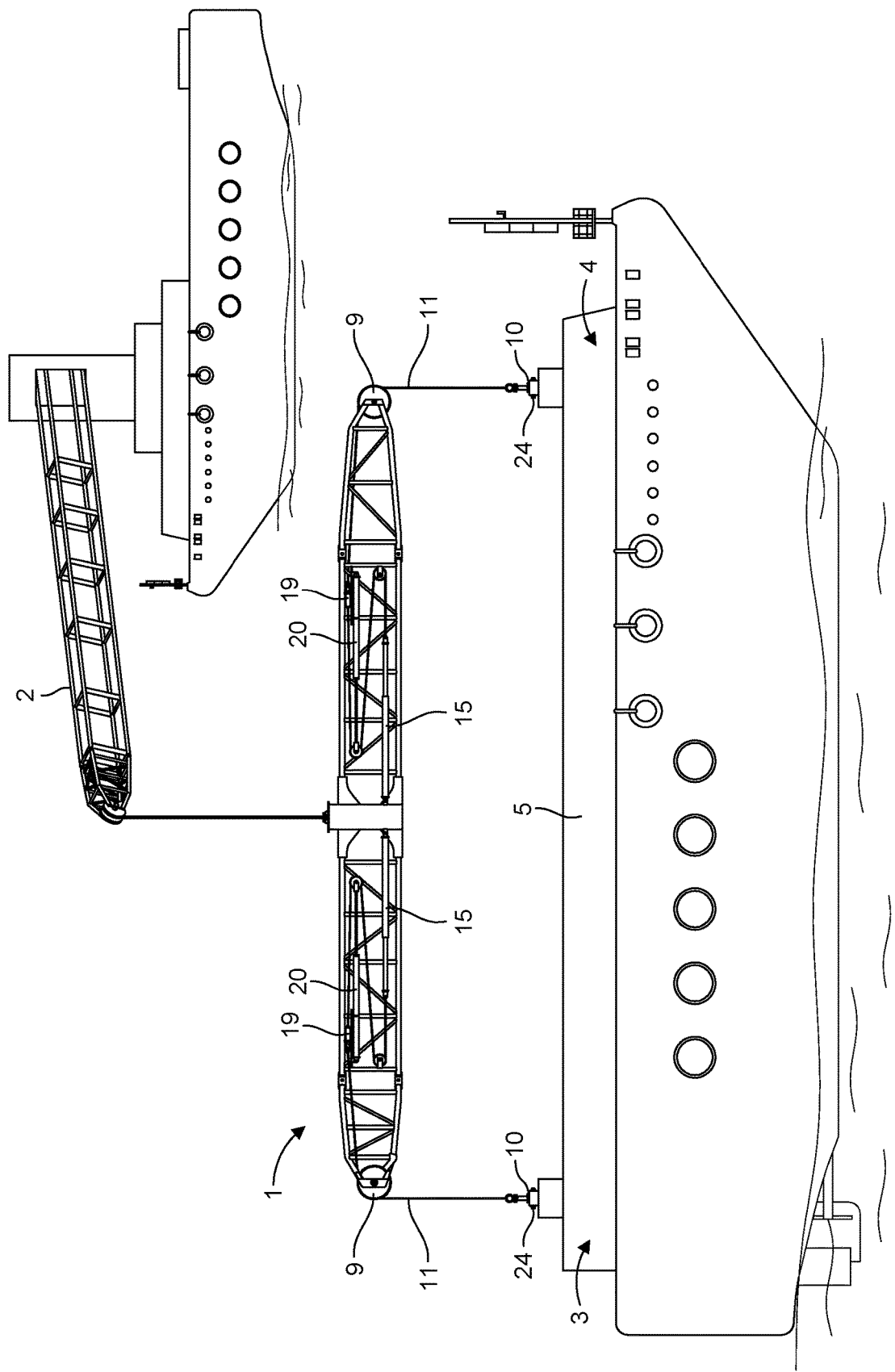
Figure 4G:
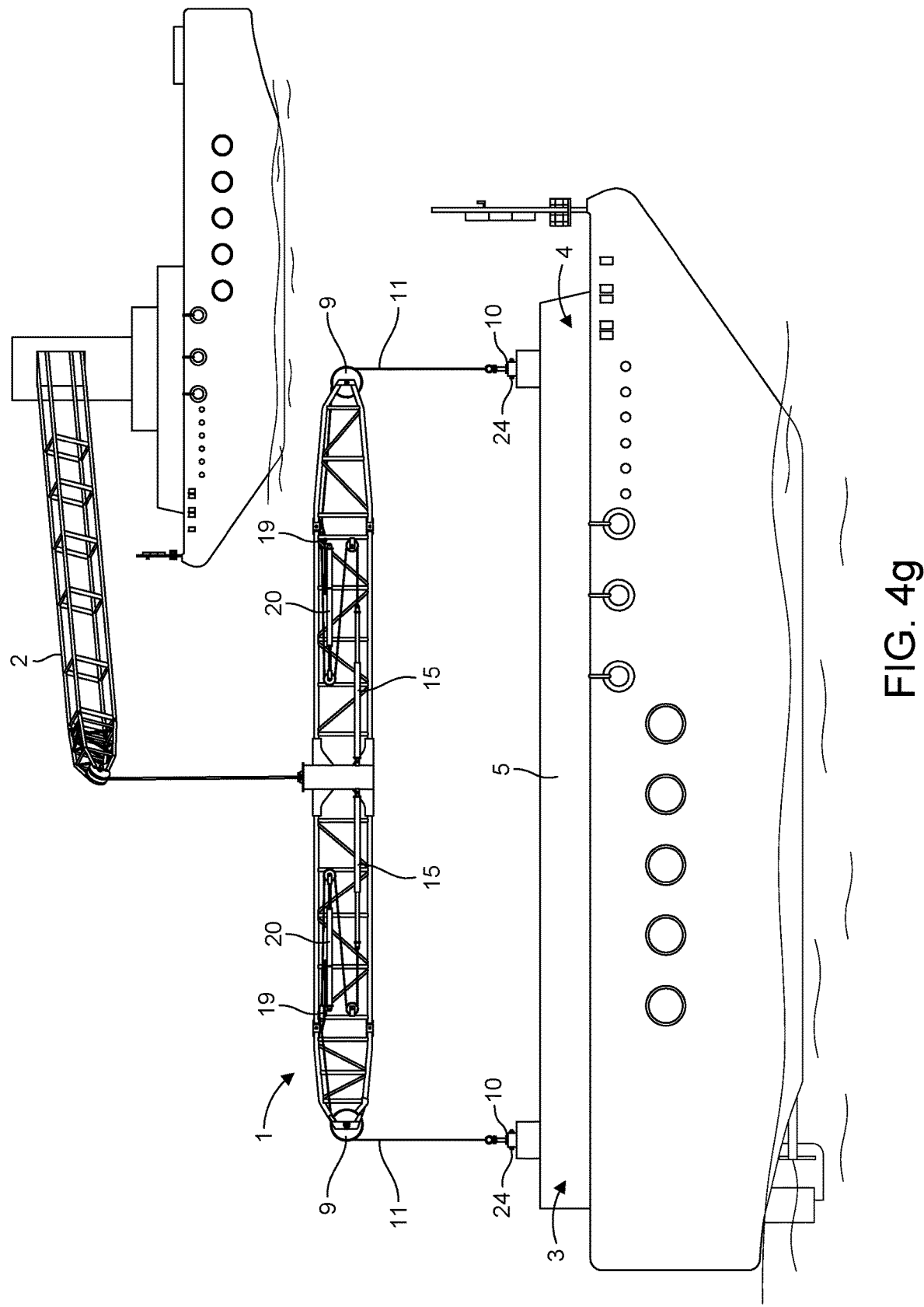
Figure 4H:
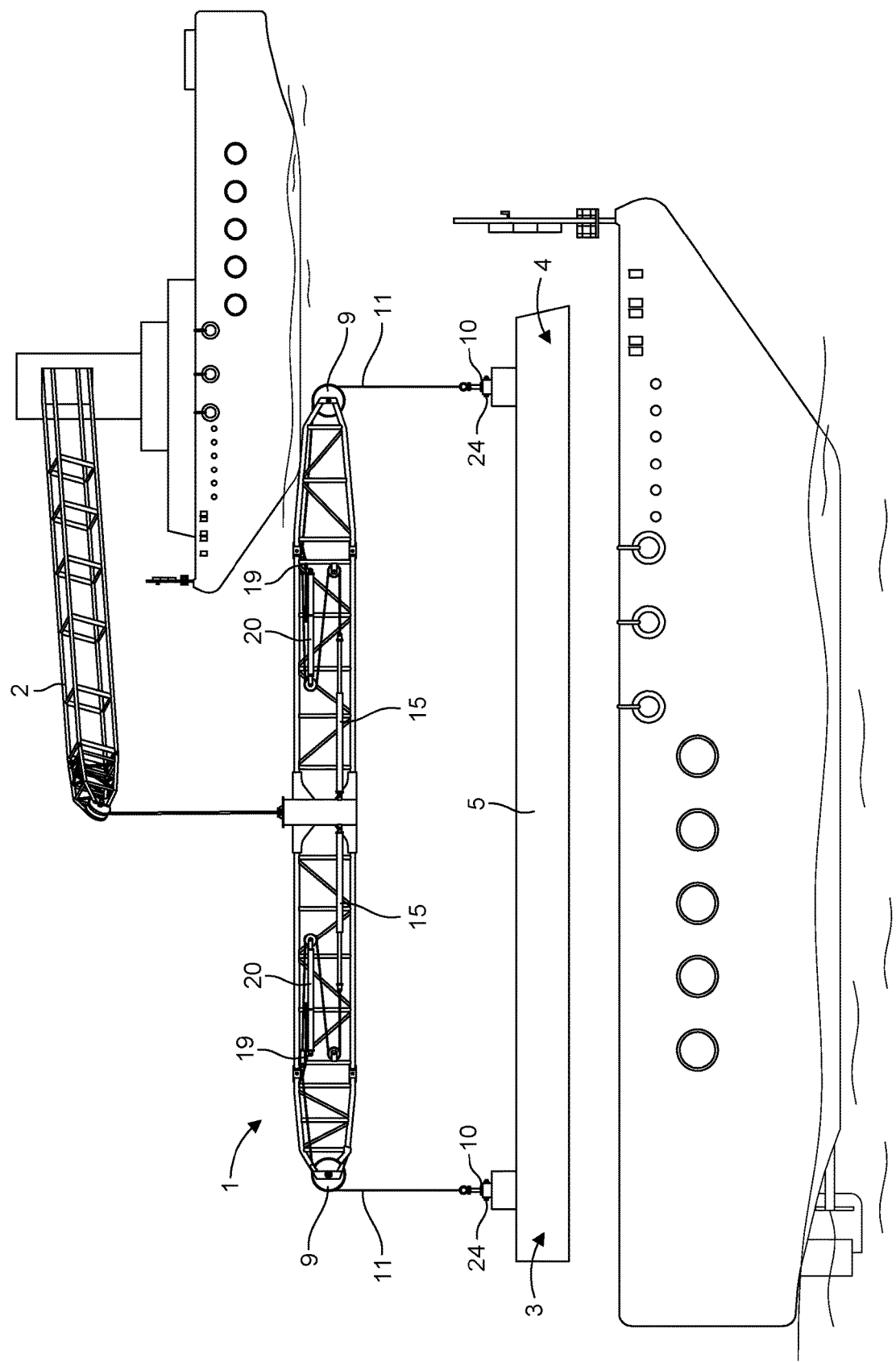

FIG. 3 schematically shows partial views of the region around the suspension element 19 that connects the actuator wire 16 and the main wire 11. In this embodiment, there are two main wires 11 arranged spaced apart whereby the stabilization of the lifting can be improved as the lifting force is distributed over a larger area of the load 5. The suspension element 19 is movable along a support 22 having a blocking element 23 arranged at a predetermined position. FIG. 3.*a* shows the suspension element 19 at one position away from the blocking element 23, and FIG. 3.*b* shows the situation where the suspension element 19 is engaged with the blocking element 23 so that it cannot move any further in that direction. When the suspension element 19 is engaged with the blocking element 23, no further compensation will take place by the compensator 20, and the lifting force from the crane can be transferred to the main wire 11 in order to lift the load 5; this will be explained in further details below. FIG. 3.*c* shows the two main wires 11 arranged guided by two lifting pulleys 9 or one lifting pulley having two guiding grooves.

The method of lifting a load 5 by using a crane 2 and spreader bar 1 as described above is further illustrated in FIG. 4. The vertical distance between the spreader bar 1 and the load to be lifted 5 may differ from what is shown schematically in the figures; it may e.g. be significantly larger. As shown in FIG. 4.*a*, the spreader bar 1 is arranged with the lifting pulley 9 of the first system 7 above the first lifting region 3 of the load 5 and the lifting pulley 9 of the second system 8 above the second lifting region 4. Then, as shown in FIG. 4.*b*, the vertical distance between the connector 10 and the first lifting region 3 is adjusted by use of the actuator 15 until the connector 10 is positioned for engagement with the first lifting region 3. The first lifting region 3 is provided with means for establishing the connection between the connector 10 and the first lifting region 3 as shown in FIG. 4.*c*. In order to ensure a secure connection, the first lifting region 3 is preferably provided with a fastening element 24 designed to mate with the connector 10. However, the connector 10 could also be provided with a hook that is fastened to a strap or rope at the load 5. Other ways of fastening is also possible and will be known to a person skilled in the art. When the first lifting region 3 has been connected to the spreader bar 1, the second lifting region 4 is to be connected. This is done as shown in FIG. 4.*d* by for the second system 8 adjusting the vertical distance between the connector 10 and the second lifting region 4 by use of the actuator 15 until the connector 10 is positioned for engagement with the second lifting region 4. At the same time, the compensator 20 of the first system 7 is allowed to adjust the length of the actuator wire 16 and main wire 11 of the first system 7 to maintain tension therein. Then, as shown in FIG. 4.*e*, the connection between the connector 10 of the second system 8 and the second lifting region 4 is established. The spreader bar 1 is then lifted by use of the crane 2 as shown in FIG. 4.*f*, and at the same time for each of the first and second systems 7,8, the compensator 20 is allowed to adjust the length of the actuator wire 16 and main wire 11 to maintain tension therein. By continued lifting of the spreader bar 1, for each of the first and second systems 7,8 the suspension element 19 is allowed to move along the support 22 until it engages with the blocking element 23 as shown in FIG. 4.*g*. At the same time, the compensator 20 is compressed. Then, by continued lifting of the spreader bar 1 as shown in FIG. 4.*h*, the load 5 is lifted.

As should be clear from the above description, the part of the first and second systems 7,8 between the blocking element 19 and the lifting pulley 9 can be considered the high load side as that part is to transfer the forces due to the weight of the load 5 to the crane 2 when the suspension element 19 abuts the blocking element 23. The other part of the first and second systems 7,8 can be considered the low load side as it only has to carry the weight and forces relating to the components themselves, including the connector 10.

Figure 5:
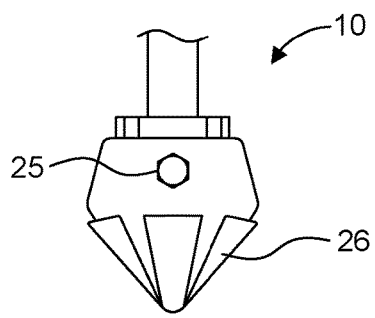
FIG. 5 schematically shows an example of a design of a connector for use with the present invention.

FIG. 5 shows schematically an example of a connector 10 which is provided with a sensor 25 and a locking mechanism 26 adapted for remote-controlled establishment of a secure connection between the connectors 10 and the load 5 to be lifted. The connector could have other designs and working mechanisms than those shown in the figures.

Figure 6:
FIG. 6 schematically shows examples of different types of actuators for use in a system according to the invention.

FIG. 6 shows schematically some examples of other types of actuators 15 that could be used instead of or in combination with the linear actuator shown in the above figures. FIG. 6.*a* shows a winch 27, and FIG. 6.*b* shows a pivotally arranged arm 28 that can be actuated back and forth.

Figure 7:
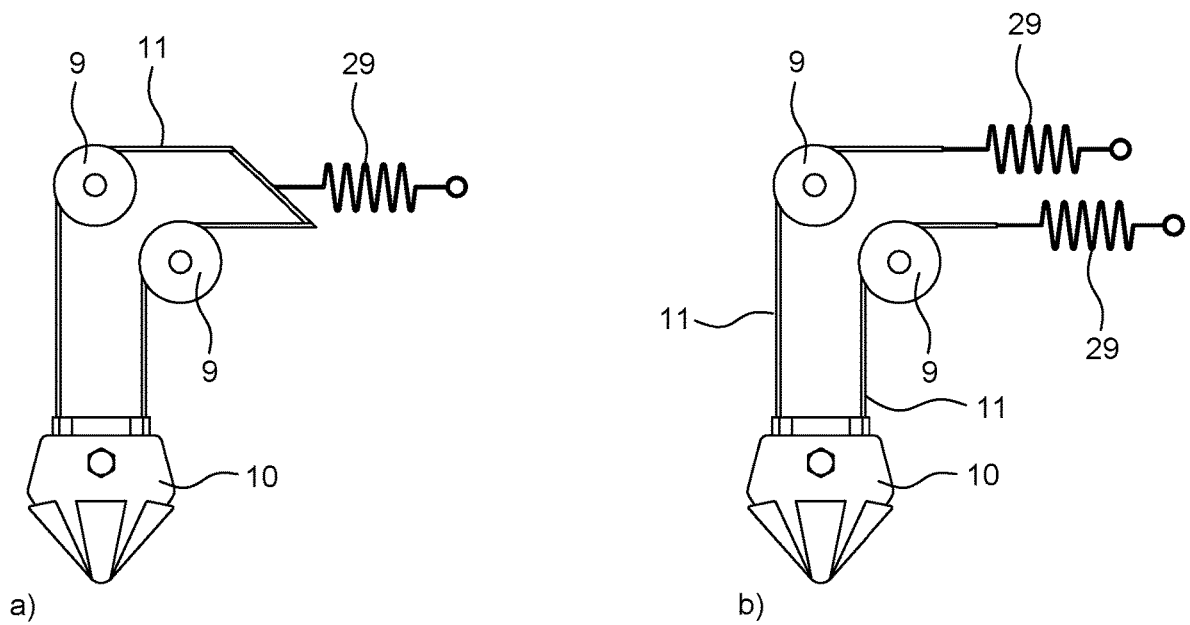
FIG. 7 schematically shows examples of different types of compensators for use in a system according to the invention.

FIG. 7 shows schematically some examples of other types of compensators 20 that could be used instead of or in combination with the linear actuator shown in the above figures. FIG. 7.*a* shows one spring 29, and FIG. 7.*b* shows two springs 29 arranged in series. What is shown schematically as springs in the figure could also be a hydraulic ram (not shown) with an accumulator, or it could be a tension winch (not shown).

Although the present invention has been described in connection with the specified embodiments, it should not be construed as being in any way limited to the presented examples. The scope of the present invention is set out by the accompanying claim set. In the context of the claims, the terms "comprising" or "comprises" do not exclude other possible elements or steps. Furthermore, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. A spreader bar for distributing a lifting force from a crane onto a first lifting region and a second lifting region of a load to be lifted, the lifting regions being separated by a horizontal distance,
   wherein the spreader bar has a frame and comprises a first system for applying a part of the lifting force to the first lifting region and a second system for applying another part of the lifting force to the second lifting region,
   wherein each of the first and second systems comprises:
      a lifting pulley arranged on the frame, so that a horizontal distance between the lifting pulleys of the first and second systems corresponds to the horizontal distance between the first and second lifting regions,
      a connector for connecting the spreader bar to the respective lifting region via a main wire guided by the lifting pulley,
      an actuator arranged on the frame for vertically moving the connector via an actuator wire,
      a suspension element connecting the actuator wire and the main wire, and
      a compensator mounted on the frame for acting on the actuator wire to compensate for possible fluctuations in the vertical distance between the respective lifting region of the load and the spreader bar and thereby ensure that the main wire and the actuator wire remain under tension after the connector has been connected to the load, and
   wherein, for each of the first and second systems, the suspension element is movable along a support having a blocking element arranged at a predetermined position, so that when the suspension element is engaged with the blocking element, no further compensation will take place by the compensator, and the lifting force from the crane can be transferred to the main wire in order to lift the load.

2. The spreader bar according to claim 1, wherein the frame of the spreader bar extends between a first end where the lifting pulley of the first system is arranged and a second end where the lifting pulley of the second system is arranged.

3. The spreader bar according to claim 1, wherein the actuators are selected from a linear actuator, a winch, a pivotally arranged arm, or a combination thereof.

4. The spreader bar according to claim 1, wherein the actuator wires are guided by guide pulleys.

5. The spreader bar according to claim 1, wherein the actuators are adapted to function independently of each other.

6. The spreader bar according to claim 1, wherein the actuators are remotely controlled.

7. The spreader bar according to claim 1, wherein each of the compensators comprises one or more of the following: linear actuator, spring, pulley, or a piston.

8. The spreader bar according to claim 1, wherein the compensators are adapted to function independently of each other.

9. The spreader bar according to claim 1, wherein the spreader bar comprises:
   first section extending from the first end to a central region, and the first system is arranged in the first section, and
   a second section extending from the second end to the central region, and the second system is arranged in the second section.

10. The spreader bar according to claim 1, wherein each of the connectors is provided with at least one sensor and at least one locking mechanism adapted for remote-controlled establishment of a secure connection between the connectors and the load to be lifted.

11. The spreader bar according to claim 1, wherein the actuator and the compensator are included in one and the same system.

12. A method of lifting a load by using a crane with a spreader bar according to claim 1, the method comprising the following steps:
arranging the spreader bar with the lifting pulley of the first system above the first lifting region of the load and the lifting pulley of the second system above the second lifting region,
for the first system, adjusting the vertical distance between the connector and the first lifting region by use of the actuator, and establishing the connection between the connector and the first lifting region,
for the second system, adjusting the vertical distance between the connector and the second lifting region by use of the actuator, and at the same time allowing the compensator of the first system to adjust the length of the actuator wire and main wire of the first system to maintain tension therein,
establishing the connection between the connector of the second system and the second lifting region,
lifting the spreader bar and at the same time for each of the first and second systems allowing the compensator to adjust the length of the actuator wire and main wire to maintain tension therein,
by continued lifting of the spreader bar, for each of the first and second systems allowing the suspension element to move along the support until it engages with the blocking element, and
by continued lifting of the spreader bar, also lifting the load.

13. The method according to claim 12, wherein the actuators are adapted to function independently of each other.

14. The method according to claim 12, wherein the actuators are remotely controlled.

15. The method according to claim 12, wherein each of the connectors is provided with at least one sensor and at least one locking mechanism, and wherein secure connections between the connectors and the load to be lifted are established by remote control.

* * * * *